United States Patent
Ahuja et al.

(10) Patent No.: US 7,434,058 B2
(45) Date of Patent: Oct. 7, 2008

(54) GENERATING SIGNATURES OVER A DOCUMENT

(75) Inventors: Ratinder Paul Singh Ahuja, Saratoga, CA (US); Erik de la Iglesia, Mountain View, CA (US); Rick Lowe, Atherton, CA (US); Matthew Howard, Saratoga, CA (US); William Deninger, Mountain View, CA (US)

(73) Assignee: Reconnex Corporation, Mountain View, CA (US)

( * ) Notice: Subject to any disclaimer, the term of this patent is extended or adjusted under 35 U.S.C. 154(b) by 685 days.

(21) Appl. No.: 10/863,311

(22) Filed: Jun. 7, 2004

(65) Prior Publication Data

US 2005/0273614 A1    Dec. 8, 2005

(51) Int. Cl.
G06F 11/30 (2006.01)
H04L 9/00 (2006.01)

(52) U.S. Cl. ........................ 713/177; 713/187; 726/32
(58) Field of Classification Search ................. 713/176, 713/177
See application file for complete search history.

(56) References Cited

U.S. PATENT DOCUMENTS

| 5,465,299 | A  | * | 11/1995 | Matsumoto et al. | 713/176 |
| 5,781,629 | A  | * | 7/1998  | Haber et al.     | 713/177 |
| 6,493,761 | B1 |   | 12/2002 | Baker et al.     |         |
| 6,499,105 | B1 | * | 12/2002 | Yoshiura et al.  | 713/176 |
| 6,785,815 | B1 | * | 8/2004  | Serret-Avila et al. | 713/176 |
| 7,158,983 | B2 | * | 1/2007  | Willse et al.    | 707/101 |
| 7,185,073 | B1 |   | 2/2007  | Gai et al.       |         |
| 2002/0052896 | A1 | * | 5/2002 | Streit et al.    | 707/517 |
| 2002/0129140 | A1 |   | 9/2002 | Peled et al.     |         |
| 2003/0028774 | A1 | * | 2/2003 | Meka             | 713/176 |
| 2003/0105739 | A1 | * | 6/2003 | Essafi et al.    | 707/1   |
| 2004/0059736 | A1 | * | 3/2004 | Willse et al.    | 707/100 |
| 2005/0021715 | A1 |   | 1/2005 | Dugatkin et al.  |         |
| 2005/0033747 | A1 | * | 2/2005 | Wittkotter       | 707/10  |
| 2005/0055399 | A1 |   | 3/2005 | Savchuk          |         |
| 2005/0132197 | A1 | * | 6/2005 | Medlar           | 713/176 |
| 2006/0288216 | A1 | * | 12/2006 | Buhler et al.   | 713/176 |

OTHER PUBLICATIONS

Ethereal. Computer program product for analyzing network traffic. http://web.archive.org/20030315045117/www.ethereal.com/distribution/docs/user-guid.
pdf?cf0A706609=410597E7D!VVNQVE9cd25vb25hbjpudGxOk-2RaYE4Be9uKDeGfG9Vuk=.

* cited by examiner

*Primary Examiner*—Christian La Forgia
(74) *Attorney, Agent, or Firm*—Blakley, Sokoloff, Taylor & Zafman, LLP

(57) ABSTRACT

A document accessible over a network can be registered. A registered document, and the content contained therein, cannot be transmitted undetected over and off of the network. In one embodiment, the invention includes maintaining a plurality of stored signatures over a registered document. In one embodiment, the plurality of stored signatures are generated by extracting content from the document, normalizing the extracted content, and generating the plurality of signatures using the normalized content.

27 Claims, 11 Drawing Sheets

GENERATING SIGNATURES OVER A DOCUMENT

FIELD OF THE INVENTION

The present invention relates to computer networks, and in particular, to registering documents in a computer network.

BACKGROUND

Computer networks and systems have become indispensable tools for modern business. Modern enterprises use such networks for communications and for storage. The information and data stored on the network of a business enterprise is often a highly valuable asset. Modern enterprises use numerous tools to keep outsiders, intruders, and unauthorized personnel from accessing valuable information stored on the network. These tools include firewalls, intrusion detection systems, and packet sniffer devices. However, once an intruder has gained access to sensitive content, there is no network device that can prevent the electronic transmission of the content from the network to outside the network. Similarly, there is no network device that can analyse the data leaving the network to monitor for policy violations, and make it possible to track down information leeks. What is needed is a comprehensive system to capture, store, and analyse all data communicated using the enterprises network.

SUMMARY OF THE INVENTION

A document accessible over a network can be registered. A registered document, and the content contained therein, cannot be transmitted undetected over and off of the network. In one embodiment, the invention includes maintaining a plurality of stored signatures over a registered document. In one embodiment, the plurality of stored signatures are generated by extracting content from the document, normalizing the extracted content, and generating the plurality of signatures using the normalized content.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Although the present system will be discussed with reference to various illustrated examples, these examples should not be read to limit the broader spirit and scope of the present invention. Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Networks

Figure 1:
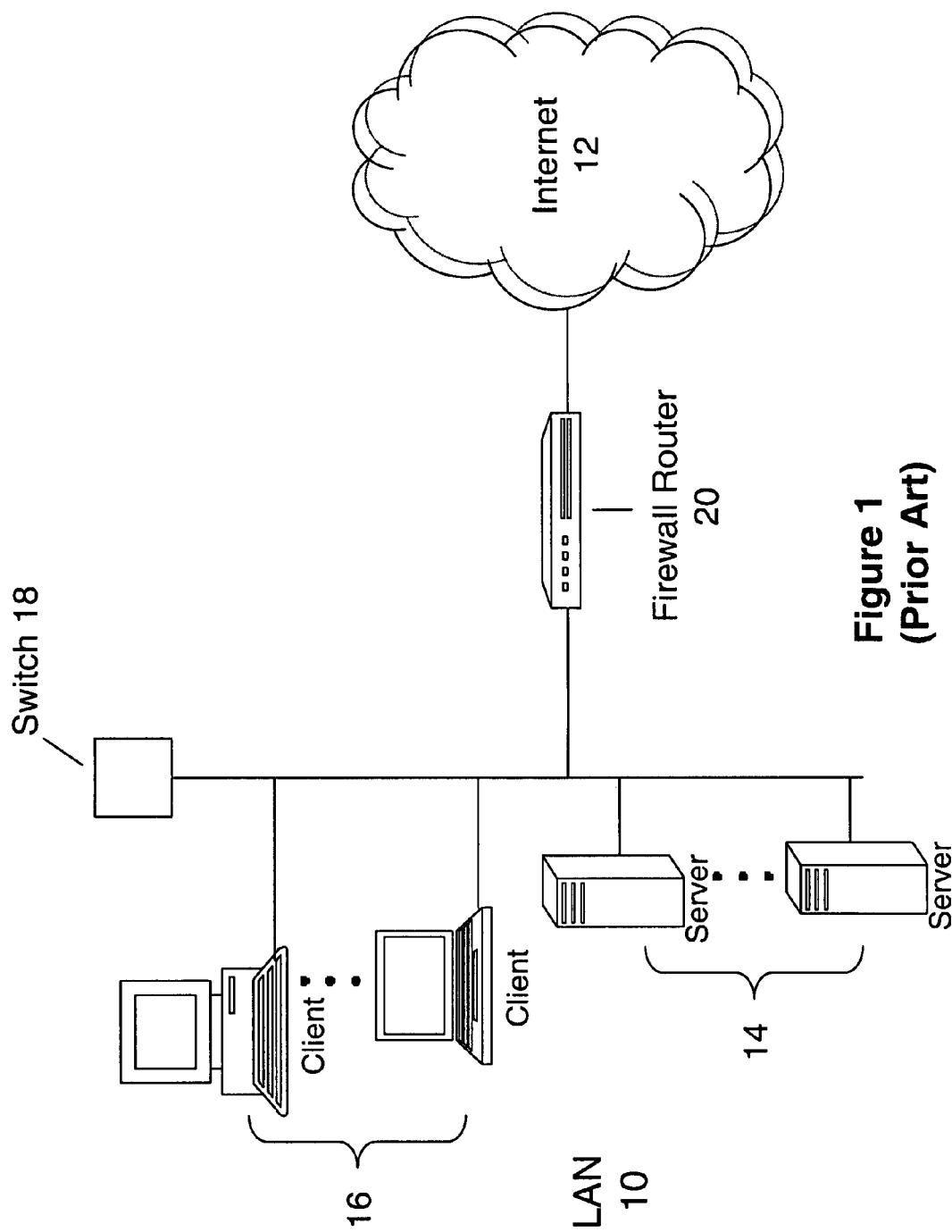
FIG. 1 is a block diagram illustrating a computer network connected to the Internet.

FIG. 1 illustrates a simple prior art configuration of a local area network (LAN) 10 connected to the Internet 12. Connected to the LAN 102 are various components, such as servers 14, clients 16, and switch 18. There are numerous other known networking components and computing devices that can be connected to the LAN 10. The LAN 10 can be implemented using various wireline or wireless technologies, such as Ethernet and 802.11b. The LAN 10 may be much more complex than the simplified diagram in FIG. 1, and may be connected to other LANs as well.

In FIG. 1, the LAN 10 is connected to the Internet 12 via a router 20. This router 20 can be used to implement a firewall, which are widely used to give users of the LAN 10 secure access to the Internet 12 as well as to separate a company's public Web server (can be one of the servers 14) from its internal network, i.e., LAN 10. In one embodiment, any data leaving the LAN 10 towards the Internet 12 must pass through the router 12. However, there the router 20 merely forwards packets to the Internet 12. The router 20 cannot capture, analyse, and searchably store the content contained in the forwarded packets.

Figure 2:
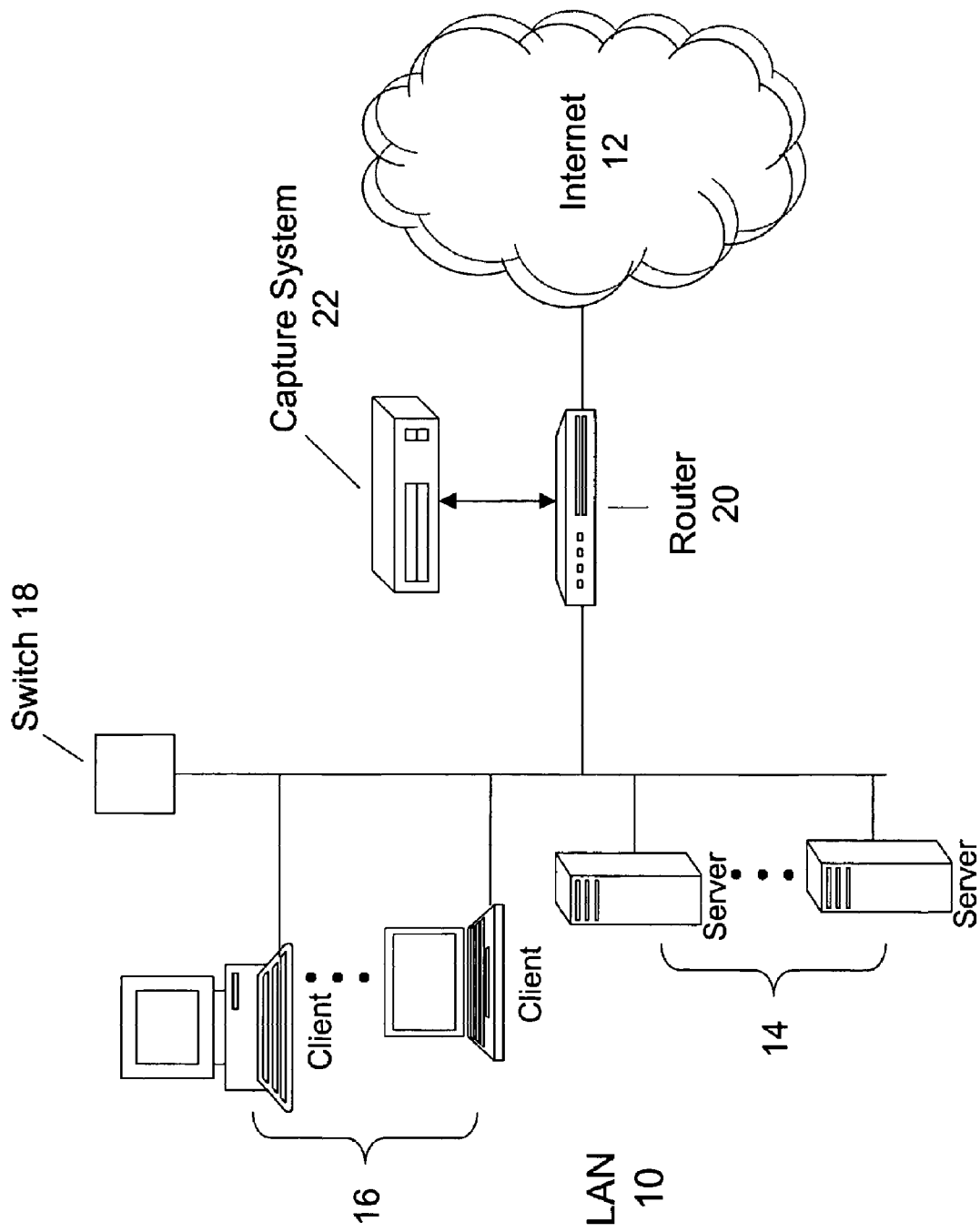
FIG. 2 is a block diagram illustrating one configuration of a capture system according to one embodiment of the present invention.

One embodiment of the present invention is now illustrated with reference to FIG. 2. FIG. 2 shows the same simplified configuration of connecting the LAN 10 to the Internet 12 via the router 20. However, in FIG. 2, the router 20 is also connected to a capture system 22. In one embodiment, the router 12 splits the outgoing data stream, and forwards one copy to the Internet 12 and the other copy to the capture system 22.

There are various other possible configurations. For example, the router 12 can also forward a copy of all incoming data to the capture system 22 as well. Furthermore, the capture system 22 can be configured sequentially in front of, or behind the router 20, however this makes the capture system 22 a critical component in connecting to the Internet 12. In systems where a router 12 is not used at all, the capture system can be interposed directly between the LAN 10 and the Internet 12. In one embodiment, the capture system 22 has a user interface accessible from a LAN-attached device, such as a client 16.

In one embodiment, the capture system 22 intercepts all data leaving the network. In other embodiments, the capture system can also intercept all data being communicated inside the network 10. In one embodiment, the capture system 22 reconstructs the documents leaving the network 10, and stores them in a searchable fashion. The capture system 22 can then be used to search and sort through all documents that have left the network 10. There are many reasons such documents may be of interest, including network security reasons, intellectual property concerns, corporate governance regulations, and other corporate policy concerns.

Capture System

Figure 3:
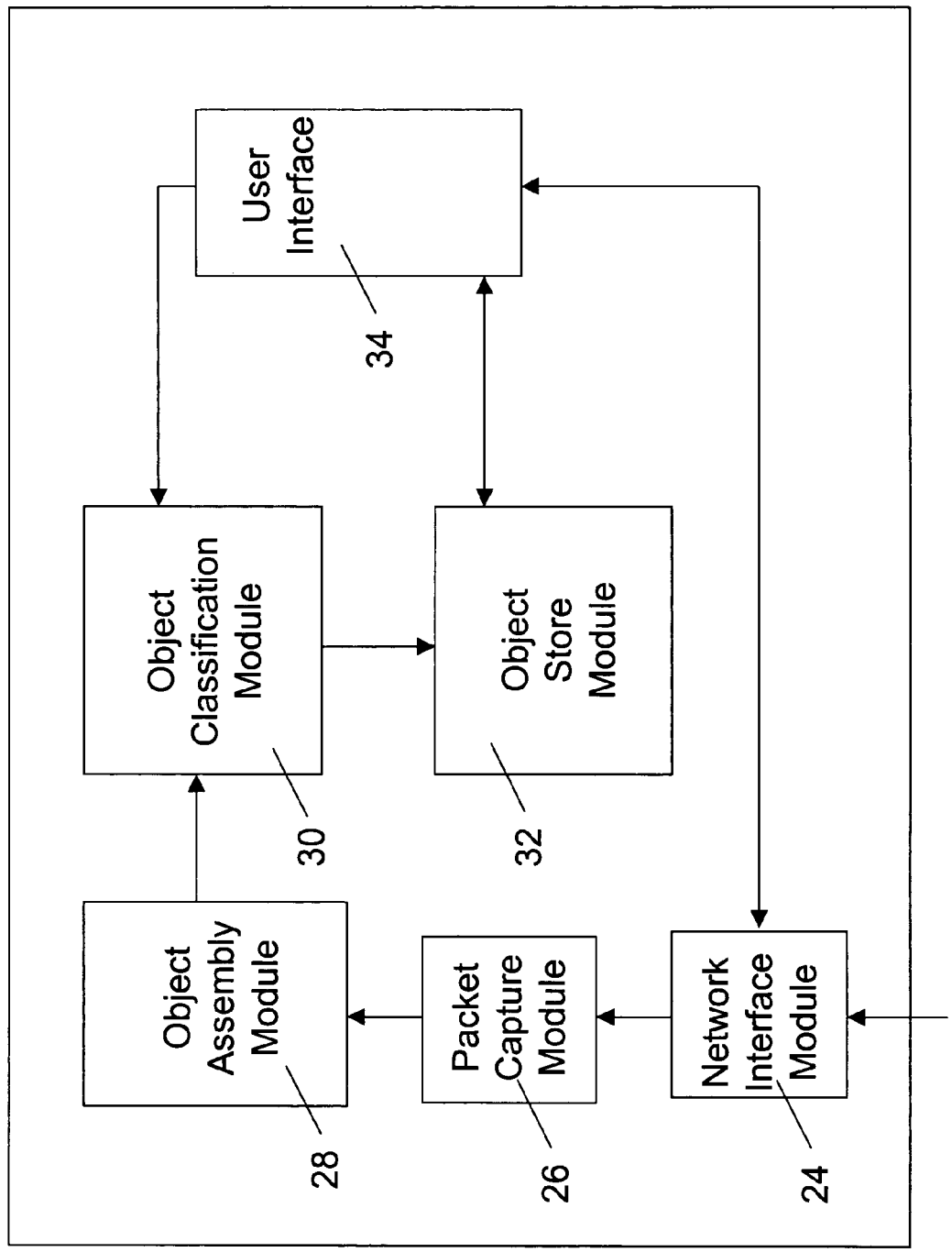
FIG. 3 is a block diagram illustrating the capture system according to one embodiment of the present invention.

One embodiment of the present invention is now described with reference to FIG. 3. FIG. 3 shows one embodiment of the capture system 22 in more detail. The capture system 22 is also sometimes referred to as a content analyzer, content or data analysis system, and other similar names. In one embodiment, the capture system 22 includes a network interface module 24 to receive the data from the network 10 or the router 20. In one embodiment, the network interface module 24 is implemented using one or more network interface cards (NIC), e.g., Ethernet cards. In one embodiment, the router 20 delivers all data leaving the network to the network interface module 24.

The captured raw data is then passed to a packet capture module 26. In one embodiment, the packet capture module 26 extracts data packets from the data stream received from the network interface module 24. In one embodiment, the packet capture module 26 reconstructs Ethernet packets from multiple sources to multiple destinations for the raw data stream.

In one embodiment, the packets are then provided the object assembly module 28. The object assembly module 28 reconstructs the objects being transmitted by the packets. For example, when a document is transmitted, e.g. as an email attachment, it is broken down into packets according to various data transfer protocols such as Transmission Control Protocol/Internet Protocol (TCP/IP) and Ethernet. The object assembly module 28 can reconstruct the document from the captured packets.

Figure 4:
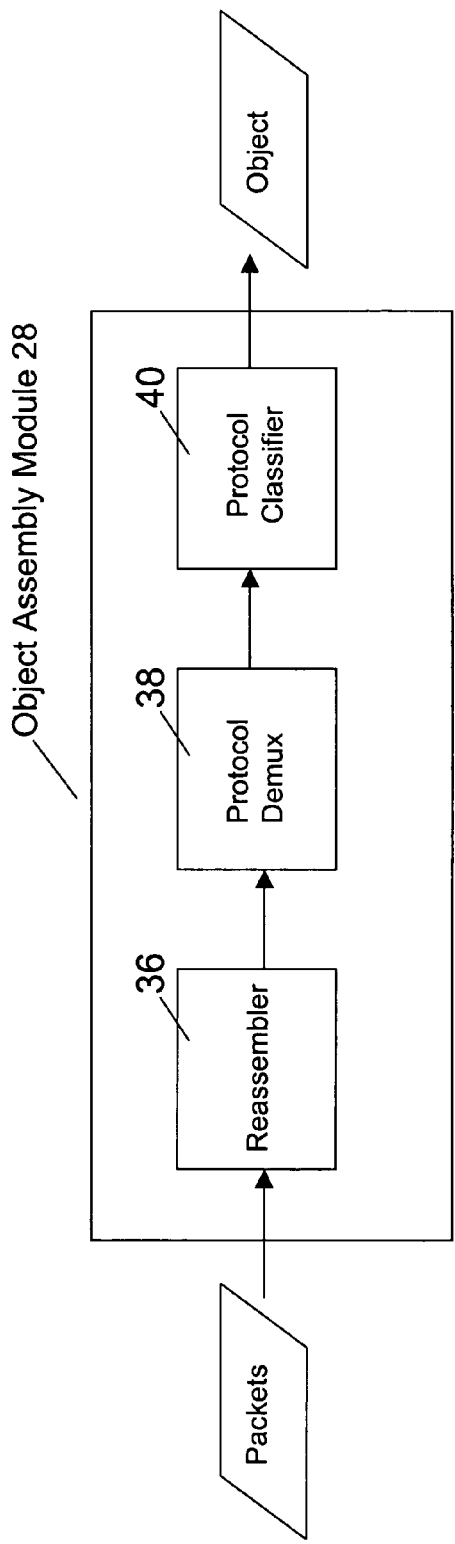
FIG. 4 is a block diagram illustrating an object assembly module according to one embodiment of the present invention.

One embodiment of the object assembly module 28 is now described in more detail with reference to FIG. 4. When packets first enter the object assembly module, they are first provided to a reassembler 36. In one embodiment, the reassembler 36 groups—assembles—the packets into unique flows. For example, a flow can be defined as packets with identical Source IP and Destination IP addresses as well as identical TCP Source and Destination Ports. That is, the reassembler 36 can organize a packet stream by sender and recipient.

In one embodiment, the reassembler 36 begins a new flow upon the observation of a starting packet defined by the data transfer protocol. For a TCP/IP embodiment, the starting packet is generally referred to as the "SYN" packet. The flow can terminate upon observation of a finishing packet, e.g., a "Reset" or "FIN" packet in TCP/IP. If now finishing packet is observed by the reassembler 36 within some time constraint, it can terminate the flow via a timeout mechanism. In an embodiment using the TPC protocol, a TCP flow contains an ordered sequence of packets that can be assembled into a contiguous data stream by the ressembler 36. Thus, in one embodiment, a flow is an ordered data stream of a single communication between a source and a destination.

The flown assembled by the reassember 36 can then be provided to a protocol demultiplexer (demux) 38. In one embodiment, the protocol demux 38 sorts assembled flows using the TCP Ports. This can include performing a speculative classification of the flow contents based on the association of well-known port numbers with specified protocols. For example, Web Hyper Text Transfer Protocol (HTTP) packets—i.e., Web traffic—are typically associated with port 80, File Transfer Protocol (FTP) packets with port 20, Kerberos authentication packets with port 88, and so on. Thus in one embodiment, the protocol demux 38 separates all the different protocols in one flow.

In one embodiment, a protocol classifier 40 also sorts the flows in addition to the protocol demux 38. In one embodiment, the protocol classifier 40—operating either in parallel or in sequence with the protocol demux 38—applies signature filters to the flows to attempt to identify the protocol based solely on the transported data. Furthermore, the protocol demux 38 can make a classification decision based on port number that is subsequently overridden by protocol classifier 40. For example, if an individual or program attempted to masquerade an illicit communication (such as file sharing) using an apparently benign port such as port 80 (commonly used for HTTP Web browsing), the protocol classifier 40 would use protocol signatures, i.e., the characteristic data sequences of defined protocols, to verify the speculative classification performed by protocol demux 38.

In one embodiment, the object assembly module 28 outputs each flow organized by protocol, which represent the underlying objects. Referring again to FIG. 3, these objects can then be handed over to the object classification module 30 (sometimes also referred to as the "content classifier") for classification based on content. A classified flow may still contain multiple content objects depending on the protocol used. For example, protocols such as HTTP (Internet Web Surfing) may contain over 100 objects of any number of content types in a single flow. To deconstruct the flow, each object contained in the flow is individually extracted, and decoded, if necessary, by the object classification module 30.

The object classification module 30 uses the inherent properties and signatures of various documents to determine the content type of each object. For example, a WORD® document has a signature that is distinct from a POWERPOINT® document, or an Email document. The object classification module 30 can extract out each individual object and sort them out by such content types. Such classification renders the present invention immune from cases where a malicious user has altered a file extension or other property in an attempt to avoid detection of illicit activity.

In one embodiment, the object classification module 30 determines whether each object should be stored or discarded. In one embodiment, this determination is based on a various capture rules. For example, a capture rule can indicate that Web Traffic should be discarded. Another capture rule can indicate that all POWERPOINT® documents should be stored, except for ones originating from the CEO's IP address. Such capture rules can be implemented as regular expressions, or by other similar means.

In one embodiment, the capture rules are authored by users of the capture system 22. The capture system 22 is made accessible to any network-connected machine through the network interface module 24 and user interface 34. In one embodiment, the user interface 34 is a graphical user interface providing the user with friendly access to the various features of the capture system 22. For example, the user interface 34 can provide a capture rule authoring tool that allows users to write and implement any capture rule desired, which are then applied by the object classification module 30 when determining whether each object should be stored. The user interface 34 can also provide pre-configured capture rules that the user can select from along with an explanation of the operation of such standard included capture rules. In one embodiment, the default capture rule implemented by the object classification module 30 captures all objects leaving the network 10.

Figure 5:
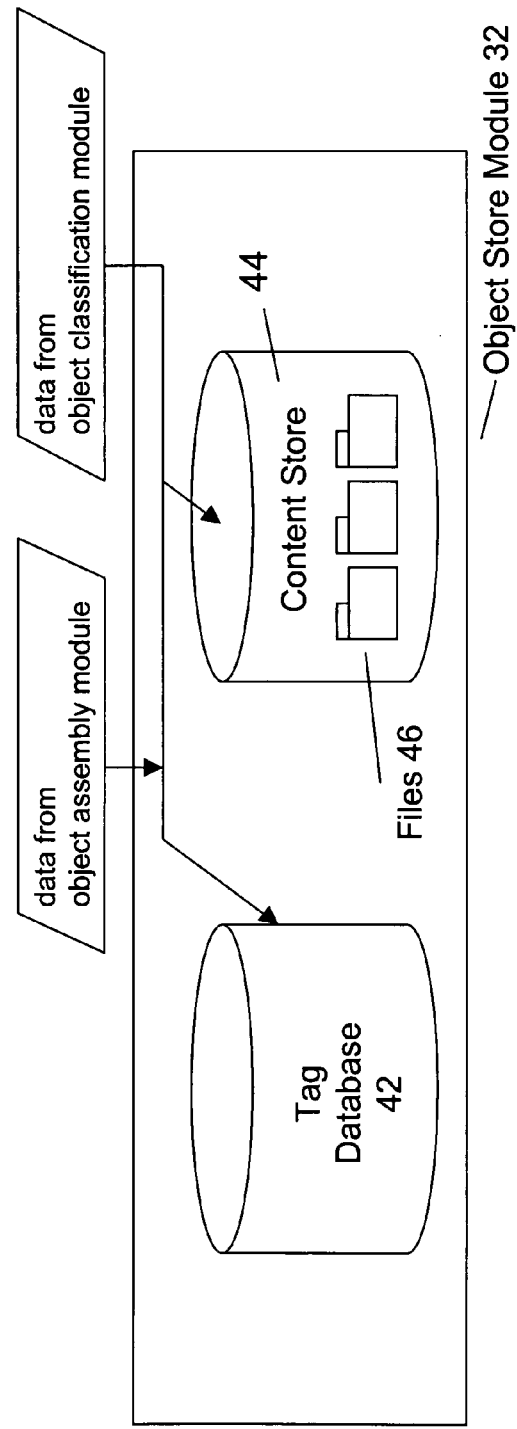
FIG. 5 is a block diagram illustrating an object store module according to one embodiment of the present invention.

If the capture of an object is mandated by the capture rules, the object classification module 30 can also determine where in the object store module 32 the captured object should be stored. With reference to FIG. 5, in one embodiment, the objects are stored in a content store 44 memory block. Within the content store 44 are files 46 divided up by content type. Thus, for example, if the object classification module determines that an object is a WORD® document that should be stored, it can store it in the file 46 reserved for WORD® documents. In one embodiment, the object store module 32 is integrally included in the capture system 22. In other embodiments, the object store module can be external—entirely or in part—using, for example, some network storage technique such as network attached storage (NAS) and storage area network (SAN).

In one embodiment, the content store is a canonical storage location, simply a place to deposit the captured objects. The indexing of the objects stored in the content store 44 is accomplished using a tag database 42. In one embodiment, the tag database 42 is a database data structure in which each record is a "tag" that indexes an object in the content store 44, and contains relevant information about the stored object. An example of a tag record in the tag database 42 that indexes an object stored in the content store 44 is set forth in Table 1:

TABLE 1

| Field Name | Definition |
| --- | --- |
| MAC Address | Ethernet controller MAC address unique to each capture system |
| Source IP | Source Ethernet IP Address of object |
| Destination IP | Destination Ethernet IP Address of object |
| Source Port | Source TCP/IP Port number of object |
| Destination Port | Destination TCP/IP Port number of the object |
| Protocol | IP Protocol that carried the object |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Hash signature of object |
| Tag Signature | Hash signature of all preceding tag fields |

There are various other possible tag fields, and some embodiments can omit numerous tag fields listed in Table 1. In other embodiments, the tag database 42 need not be implemented as a database; other data structures can be used. The mapping of tags to objects can, in one embodiment, be obtained by using unique combinations of tag fields to construct an object's name. For example, one such possible combination is an ordered list of the Source IP, Destination IP, Source Port, Destination Port, Instance and Timestamp. Many other such combinations including both shorter and longer names are possible. In another embodiment, the tag can contain a pointer to the storage location where the indexed object is stored.

Referring again to FIG. 3, in one embodiment, the objects and tags stored in the object store module 32 can be interactively queried by a user via the user interface 34. In one embodiment the user interface can interact with a web server (not shown) to provide the user with Web-based access to the capture system 22. The objects in the content store module 32 can thus be searched for specific textual or graphical content using exact matches, patterns, keywords, and various other advanced attributes.

For example, the user interface 34 can provide a query-authoring tool (not shown) to enable users to create complex searches of the object store module 32. These search queries can be provided to a data mining engine (not shown) that parses the queries, scans the tag database 42, and retrieves the found object from the content store 44. Then, these objects that matched the specific search criteria in the user-authored query can be counted and displayed to the user by the user interface 34.

Searches can also be scheduled to occur at specific times or at regular intervals, that is, the user interface 34 can provide access to a scheduler (not shown) that can periodically execute specific queries. Reports containing the results of these searches can be made available to the user at a later time, mailed to the administrator electronically, or used to generate an alarm in the form of an e-mail message, page, syslog or other notification format.

In several embodiments, the capture system 22 has been described above as a stand-alone device. However, the capture system of the present invention can be implemented on any appliance capable of capturing and analysing data from a network. For example, the capture system 22 described above could be implemented on one or more of the servers 14 or clients 16 shown in FIG. 1. The capture system 22 can interface with the network 10 in any number of ways, including wirelessly.

Figure 6:
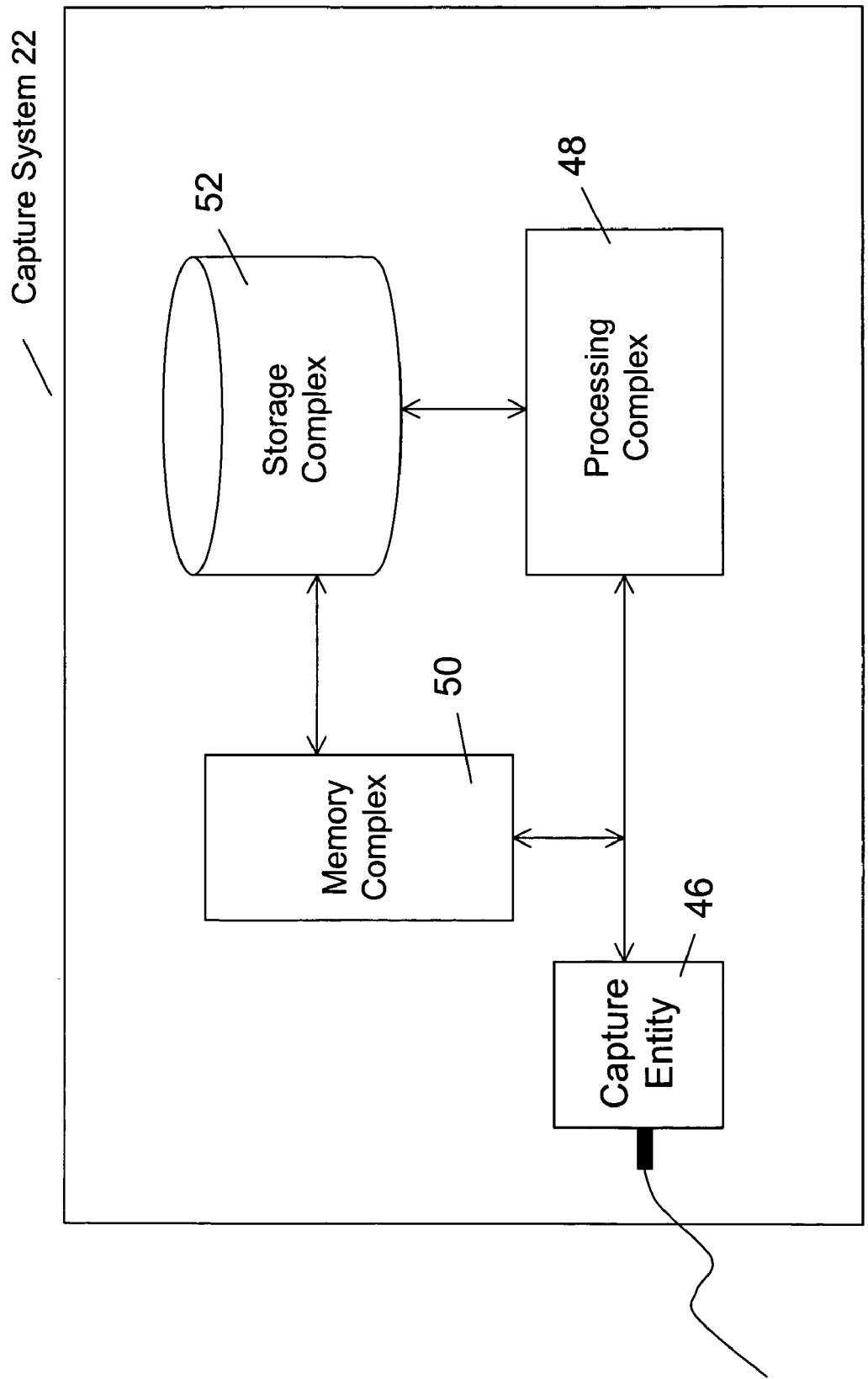
FIG. 6 is a block diagram illustrating an example hardware architecture for a capture system according to one embodiment of the present invention.

In one embodiment, the capture system 22 is an appliance constructed using commonly available computing equipment and storage systems capable of supporting the software requirements. In one embodiment, illustrated by FIG. 6, the hardware consists of a capture entity 46, a processing complex 48 made up of one or more processors, a memory complex 50 made up of one or more memory elements such as RAM and ROM, and storage complex 52, such as a set of one or more hard drives or other digital or analog storage means. In another embodiment, the storage complex 52 is external to the capture system 22, as explained above. In one embodiment, the memory complex stored software consisting of an operating system for the capture system device 22, a capture program, and classification program, a database, a filestore, an analysis engine and a graphical user interface.

Document Registration

The capture system 22 described above can also be used to implement a document registration scheme. In one embodiment, the a user can register a document with the system 22, which can then alert the user if all or part of the content in the registered document is leaving the network. Thus, one embodiment of the present invention aims to prevent unauthorized documents of various formats (e.g., Microsoft WORD®, EXCEL®, POWERPOINT®, source code of any kind, text) from leaving an enterprise. There are great benefits to any enterprise that can keep its intellectual property, or other critical, confidential, or otherwise private and proprietary content from being mishandled.

Figure 7:
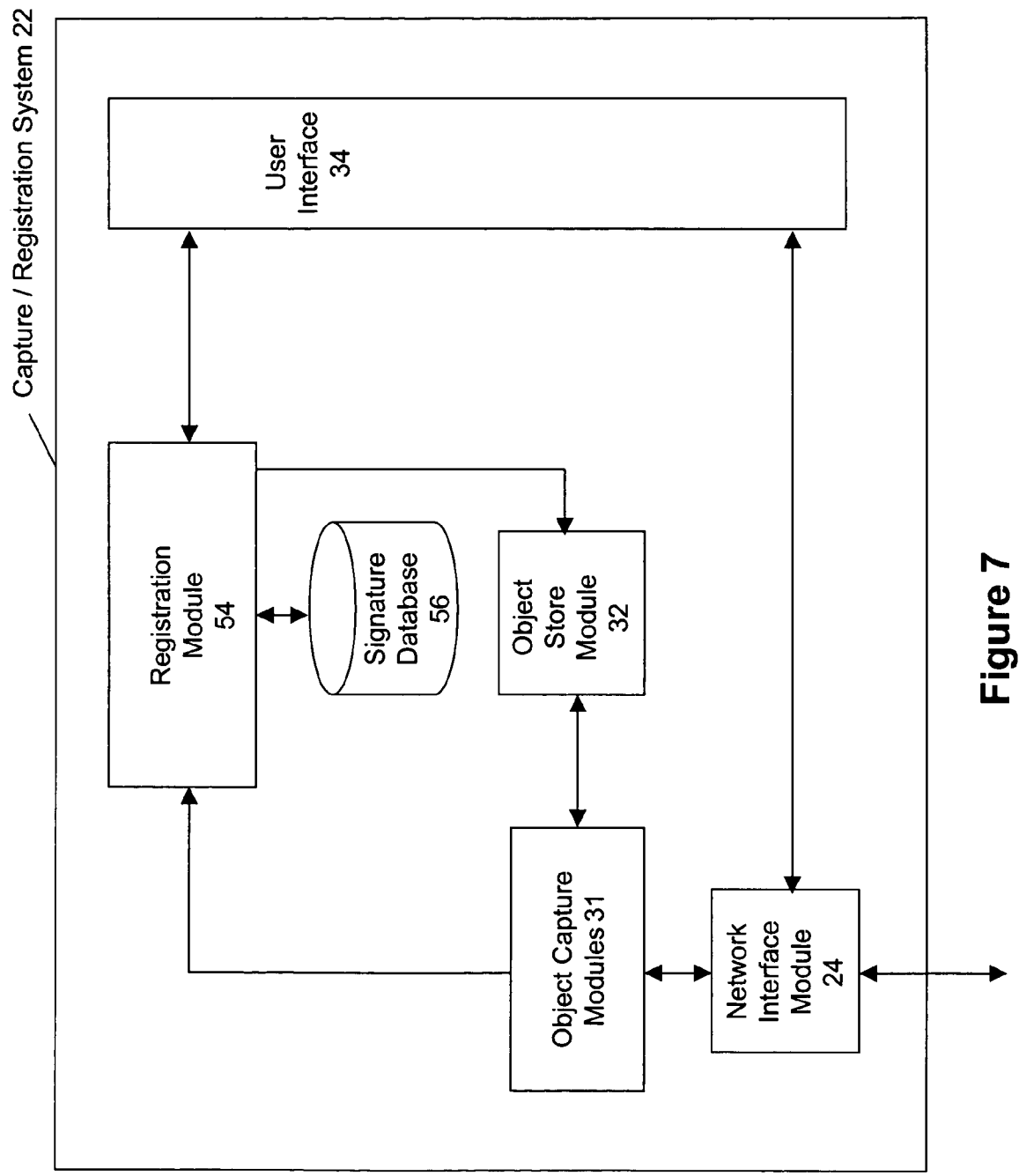
FIG. 7 is a block diagram illustrating a document registration system according to one embodiment of the present invention.

In one embodiment of the present invention, sensitive documents are registered with the capture system 22, although data registration can be implemented using a separate device in other embodiments. One embodiment of implementing registration capability in the capture system 22 is now described with reference to FIG. 7. For descriptive purposes, the capture system 22 is renamed the capture/registration system 22 in FIG. 7, and is also sometimes referred to as the registration system 22 in the description herein. The capture/registration system 22 has components similar or identical to the capture system 22 shown in FIG. 3, including the network interface module 24, the object store module 32, the user interface 34, and the packet capture 26, object assembly 28, and object classification 30 modules, which are grouped together as object capture modules 31 in FIG. 7.

In one embodiment, the capture/registration system 22 also includes a registration module 54 interacting with a signature database 56 to facilitate a registration scheme. In one embodiment, the user can register a document via the user interface 34. There are numerous ways to register documents. For example, a document can be electrically mailed (e-mailed), or uploaded to the registration system 22. The registration system 22 can also periodically scan a file server (registration server) for documents to be registered. The registration process can be integrated with the enterprise's document management systems. Document registration can also be automated and transparent based on registration rules, such as "register all documents," or "register all documents by specific author or IP address," and so on.

After being received, in one embodiment, a document to be registered is passed to the registration module 54. The registration module 54 calculates a signature of the document, or a set of signatures. The set of signatures associated with the document can be calculated in various ways. For example, the signatures can be made up of hashes over various portions of the document, such as selected or all pages, paragraphs, tables and sentences. Other possible signatures include, but are not limited to, hashes over embedded content, indices, headers or footers, formatting information or font utilization. The signatures can also include computations and meta-data other than hash digests, such as Word Relative Frequency Methods (RFM)—Statistical, Karp-Rabin Greedy-String-Tiling-Transposition, vector space models, and diagrammatic structure analysis. Additional example signature generation processes are set forth and explained further below.

The set of signatures is then stored in the signature database 56. The signature database 56 need not be implemented as a database; the signatures can be maintained using any appropriate data structure. In one embodiment, the signature database 56 is part of the storage complex 52 in FIG. 6.

In one embodiment, the registered document is also stored as an object in the object store module 32. In one embodiment, the document is only stored in the content store 44 with no associated tag, since many tag fields do not apply to registered documents. In one embodiment, one file of files 46 is a "Registered Documents" file.

In one embodiment, the document received from the user is now registered. As set forth above, in one embodiment, the object capture modules 31 continue to extract objects leaving the network, and store various objects based on capture rules. In one embodiment, all extracted objects—whether subject to a capture rule or not—are also passed to the registration module for a determination whether each object is, or includes part of, a registered document.

In one embodiment, the registration module 54 calculates the set of signatures of an object received from the object capture modules 31 in the same manner as of a document received from the user interface 34 to be registered. This set of signatures is then compared against all signatures in the signature database 56. In other embodiment, parts of the signature database can be excluded from this search to save time.

In one embodiment, an unauthorized transmission is detected if any one or more signatures in the set of signatures of an extracted object matches one or more signature in the signature database 56 associated with a registered document. Other detection tolerances can be configured for different embodiment, e.g., at least two signatures must match. Also, special rules can be implemented that make the transmission authorized, e.g., if the source address is authorized to transmit any documents off the network.

Figure 8:
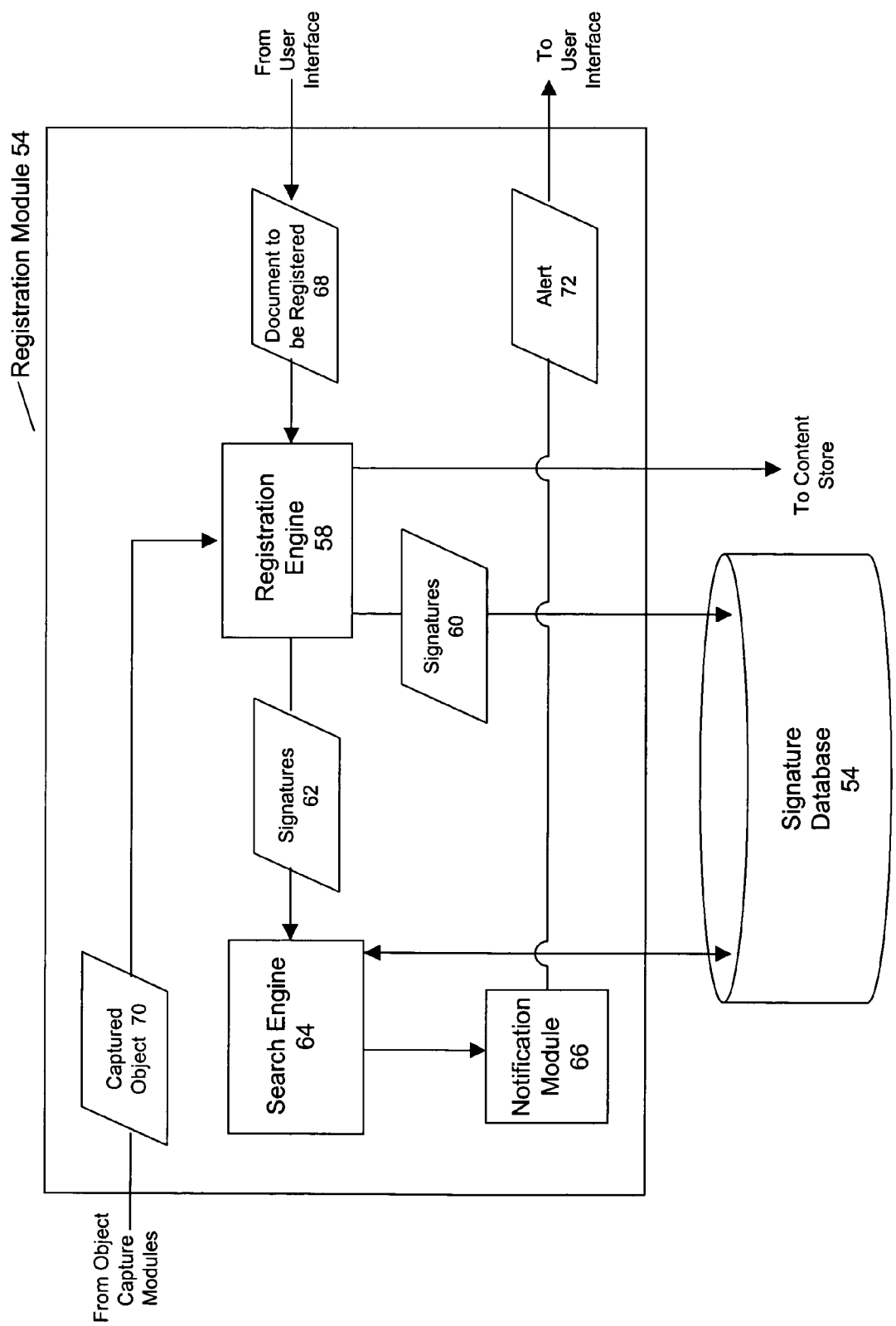
FIG. 8 is a block diagram illustrating registration module according to one embodiment of the present invention.

One embodiment of the registration module 54 is now described with reference to FIG. 8. As discussed above, a document to be registered 68 arrives via the user interface 34. The registration engine 58 generates signatures 60 for the document 68 and forwards the document 68 to the content store 44 and the signatures 60 to the signature database 54. The signatures 60 are associated with the document, e.g., by including a pointer to the document 68, or to some attribute from which the document 68 can be identified.

A captured object 70 arrives via the object capture modules 31. The registration engine calculates the signatures 62 of the captured object, and forwards them to the search engine 64. The search engine 64 queries the signature database 54 to compare the signatures 62 to the signatures stored in the signature database 54. Assuming for the purposes of illustration, that the captured object 70 is WORD® document that contains a pasted paragraph from registered POWERPOINT® document 68, at least one signature of signatures 62 will match a signature of signatures 60. Such an event can be referred to as the detection of an unauthorized transfer, a registered content transfer, or other similarly descriptive terms.

In one embodiment, when a registered content transfer is detected, the transmission can be halted with or without warning to the sender. In one embodiment, in the event of a detected registered content transfer, the search engine 64 activates the notification module 66, which sends an alert 72 to the user via the user interface 34. In one embodiment, the notification module 66 sends different alerts—including different user options—based on the user preference associated with the registration, and the capabilities of the registration system 22.

In one embodiment, the alert 72 can simply indicate that the registered content, i.e., the captured object 70, has been transferred off the network. In addition, the alert 72 can provide information regarding the transfer, such as source IP, destination IP, any other information contained in the tag of the captured object, or some other derived information, such as the name of the person who transferred the document off the network. The alert 72 can be provided to one or more users via e-mail, instant message (IM), page, or any other notification method. In one embodiment, the alert 72 is only sent to the entity or user who requested registration of the document 68.

In another embodiment, the delivery of the captured object 70 is halted—the transfer is not completed—unless the user who registered the document 68 consents. In such an embodiment, the alert 72 can contain all information described above, and in addition, contain a selection mechanism, such as one or two buttons—to allow the user to indicate whether the transfer of the captured object 70 may be completed. If the user elects to allow the transfer, for example because he is aware that someone is emailing a part of a registered document 68 (e.g., a boss asking his secretary to send an email), the transfer is executed and the object 70 is allowed to leave the network.

If the user disallows the transfer, the captured object 70 is not allowed off the network, and delivery is permanently halted. In one embodiment, halting delivery can be accomplished by implementing an intercept technique by having the registration system 22 proxy the connection between the network and the outside. In other embodiments, delivery can be halted using a black hole technique—discarding the packets without notice if the transfer is disallowed—or a poison technique—inserting additional packets onto the network to cause the sender's connection to fail.

Figure 9:
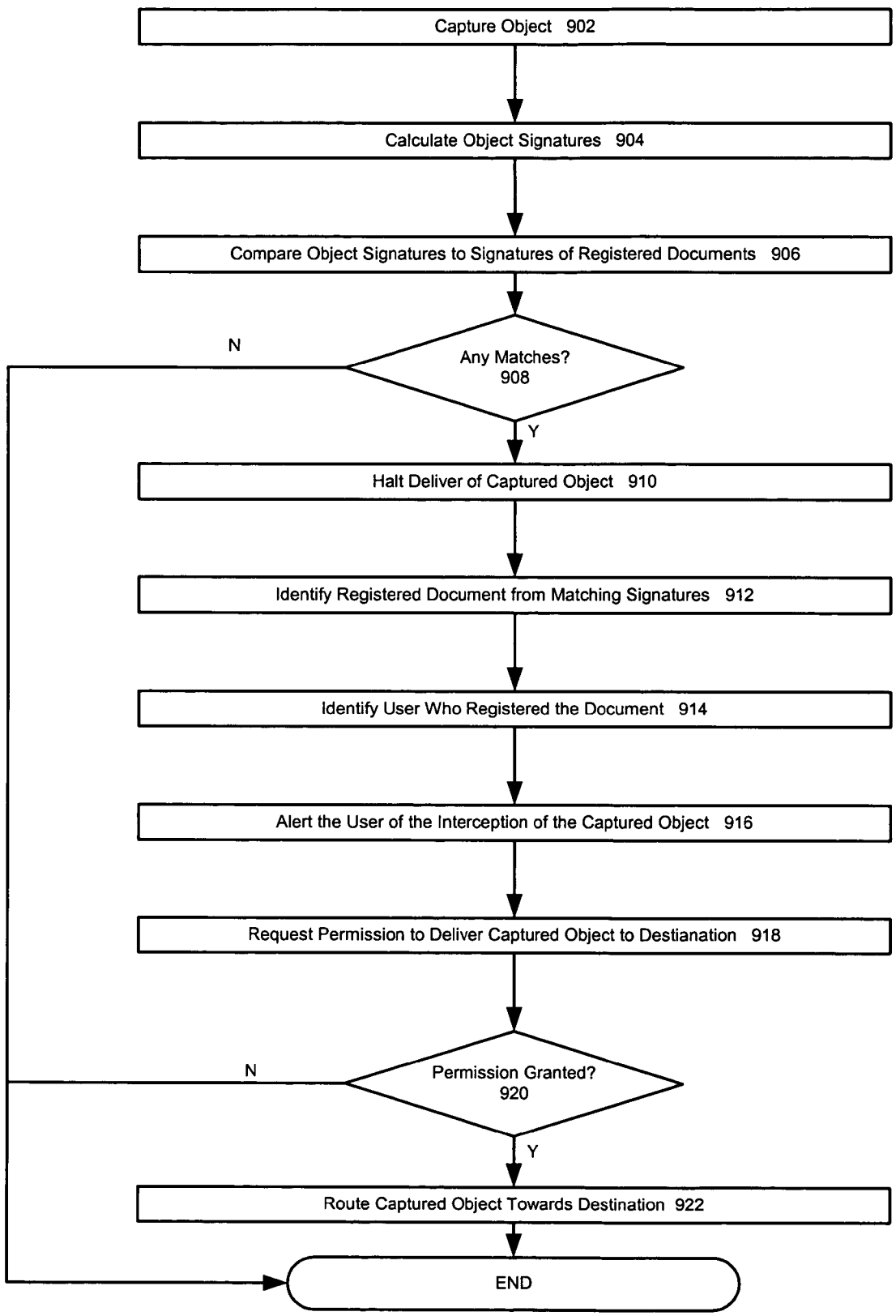
FIG. 9 is a flow diagram illustrating object capture processing according to one embodiment of the present invention.

FIG. 9 provides a flow chart to further illustrate object capture/intercept processing according to one embodiment of the present invention. All blocks of FIG. 9 have already been discussed herein. The example object capture processing shown in FIG. 9 assumes that various documents have already been registered with the registration system 22. The process shown in FIG. 9 can be repeated for all objects captured by the system 22.

Documents can be de-registered using processes similar to registration. Document de-registration is described in more detail in U.S. patent application Ser. No. 10/854,005 entitled "DOCUMENT DE-REGISTRATION," by Ahuja, de la Iglesia, Lowe, and Howard, filed on May 25, 2004, which is hereby fully incorporated by reference.

Signature Generation

Several embodiments for using signatures over the content of a document to register the document and to detect content from the document being transmitted over a network are described above. There are various methods and processes by which the signatures can be generated. These processes can be implemented, for example, in the registration engine 58 in FIG. 8, or in block 904 of FIG. 9.

One embodiment of generating the signatures is now described with reference to FIG. 10. Since each application of the process generates signatures for a document, in one embodiment, the input of the process is a document. The document can be either one being registered, or one being intercepted. If the document is being registered, then the generated signatures are stored in the signature database; otherwise, the generated signatures are compared to the signatures stored in the signature database.

In block 1010, the content of the document is extracted and/or decoded depending on the type of content contained in the document. In one embodiment, the content is extracted by removing the encapsulation of the document. For example, if the document is a MS WORD® file, then the textual content of the file is extracted and the specific MS WORD® formatting is removed. If the document is a PDF file, then the content is also decoded, since the PDF format uses encoded content.

In one embodiment, to perform the text extraction/decoding in block 1010, the content type of the document is detected, for example from the tag associated with the document. Then, the proper extractor/decoder is selected based on the content type. Each content type has an associated extractor/decoder that extracts and/or decodes the content of the document as required. Several off the shelf products are available, such as the PDFtoText software, that can be used for the extractor/decoder, or a new one can be created for each possible content type.

In block 1020, the plaintext content resulting from the extraction/decoding is normalized. In one embodiment, normalization includes removing excess delimiters from the plaintext. Delimiters can be any characters used to separate text, such as a space, a comma, a semicolon, a slash, and so on. For example, the extracted text version of an MS EXCEL® spreadsheet may have two slashes between all table entries. The normalized text may have only one slash between each table entry, or it may have one space between each table entry and one space between the words and numbers of the text extracted from each entry.

In one embodiment, normalization also includes delimiting items in an intelligent manner. For example, credit card numbers may have spaces between them, but they are one item. Similarly, e-mail addresses may look like several words but they are one item in the normalized plaintext content. Similarly, strings and text identified as irrelevant can be discarded as part of the normalization procedure.

In one embodiment, such evaluations are made by comparison to a pattern. For example, a pattern for a social security number may be XXX-XX-XXXX, where each X is a digit from 0-9. A pattern for an email address may be word@word.three-letter-word. Similarly, irrelevant (non-unique) stings, e.g. copyright notices, can have associated patterns.

In one embodiment, the pattern comparison is prioritized. For example, an email address may be considered more restrictive than a proper name. Thus, a string that may be either, is first tested as a possible email address. If the string matches the email pattern, then it is classified as an email address and normalized as such. If, however, it is determined that the string is not an email address, then it is tested against the proper name pattern (which may be combination of known names). If there is a match, then the string is normalized as a proper name. Otherwise it is normalized as any other normal word.

By comparing the normalization patterns against the string to be normalized in sequence, an implicit pattern hierarchy is established. In one embodiment, the hierarchy is organized such that the more restrictive, i.e. unique, a pattern is, the higher its priority, i.e., the earlier it is compared with the string. There can be any number of normalization patterns used, and the list of patterns may be configurable to account for the needs of the specific enterprise.

As set forth above, in one embodiment, normalization also includes discarding text that is irrelevant for signature generation purposes. In one embodiment, text that is known not to be unique to the document is considered irrelevant. For example, the copyright notice that begins a source code document, such as a C_Source file, is not relevant for signature generation, since every source code document of the enterprise has the identical textual notice. In one embodiment, irrelevant text is identified based on matching an enumerated list of known irrelevant text. Irrelevant text can also be identified by keeping count of certain text and thus identifying frequently reoccurring strings (e.g., stings occurring above a certain threshold rate) as non-unique and thus irrelevant. Other processes to identify irrelevant text include, but are not limited to, identification through pattern matching (as described above), identification by matching against a template, and heuristic methods requiring parsing of examples of other documents of the same type.

Next, in block 1030, the delimited text items of the normalized text content are tokenized, i.e., converted into a list of tokens. In one embodiment, tokenizing involves only listing the delimited items. In another embodiment, each item is converted to a token of fixed size. In one embodiment, each text item is hashed into a fixed-size binary number, e.g., an 8-bit token. Other embodiments may use any fixed or configurable size hash. Any appropriate hash function may be used for tokenizing, e.g., an MD5 hash.

Figure 11:
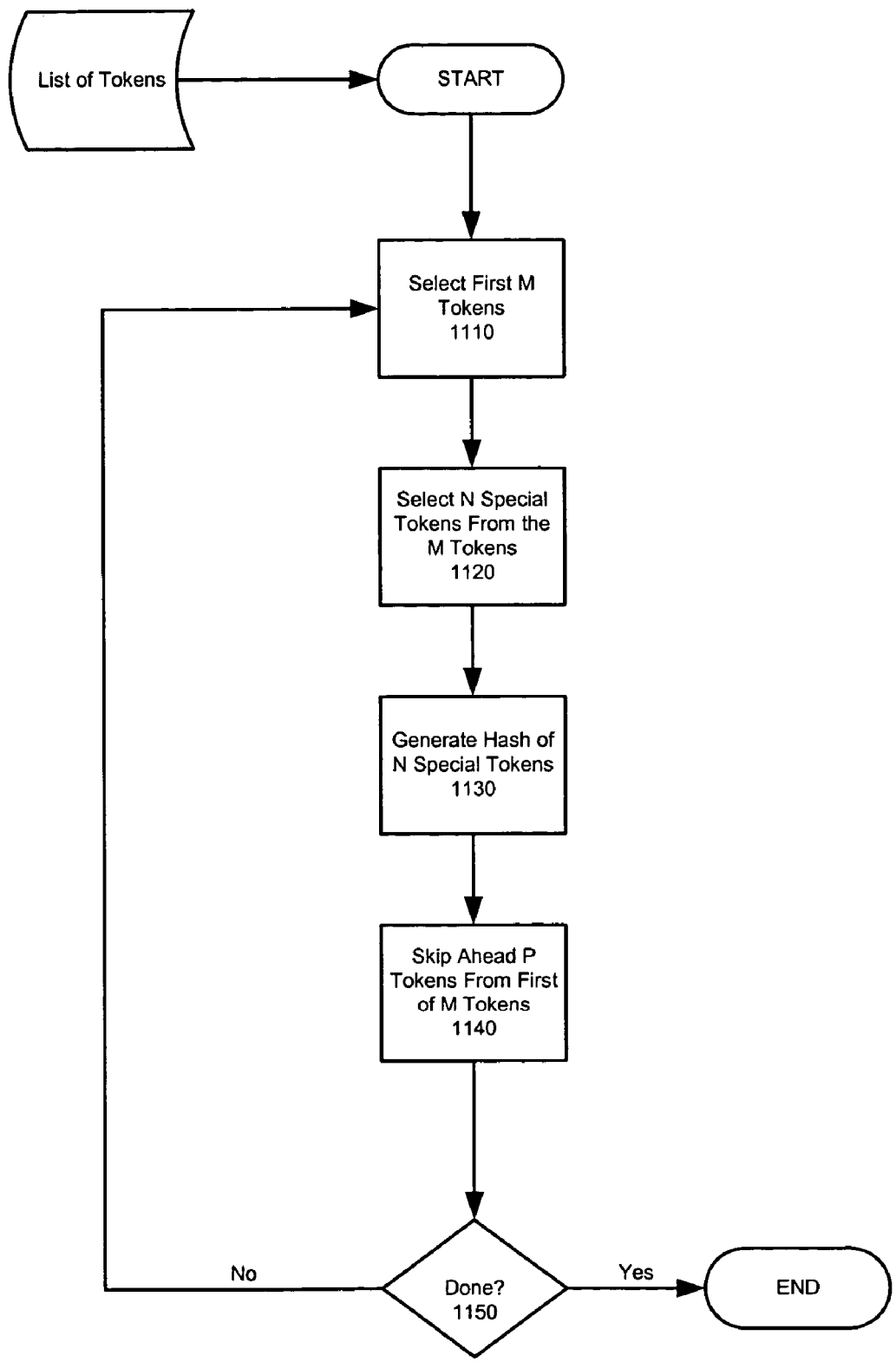
FIG. 11 is a flow diagram illustrating generating signatures from tokens according to one embodiment of the present invention.

In block 1040, the document signatures are generated from the list of tokens. There are numerous ways to generate the signatures from the tokens. One embodiment for turning the tokens into document signatures is now described with reference to FIG. 11. The input of the process illustrated by FIG. 11 is the list of tokens generated from the document. In block 1110, the first M tokens on the list are selected, where M can be any appropriate positive integer value. For example if M is 10, then the first ten tokens on the list are selected in block 1110.

In block 1120, of the selected M tokens, N special tokens are selected, N also being an appropriate positive integer that is less than, or equal to, M. The N special tokens can be selected randomly. In one embodiment, the N special tokens are chosen based in part on size. In another embodiment, the N special tokens are chosen based in part on obscurity. For example, tokens that occur less frequently are more obscure, and thus more likely to be selected as a special token. A token dictionary can be provided to log the frequency of tokens.

In one embodiment, the special tokens are selected based on the type of the token, as defined by the normalization pattern matched by the source string. As set forth above, during the normalization process, some strings are identified as higher priority text (such as email addresses, credit card numbers, etc.) the tokenization of which result in higher priority tokens. Thus, the selection of the N special tokens can take the source string into account in that manner.

In one embodiment, tokens have an associated priority value that can be used in selecting the special tokens. The priority value can be based on the priority of the normalization pattern matched by the token (e.g., social security number, credit card number, email address, ect.), or based on additional signs of uniqueness, such as the frequency of capitalized letters, and the inclusion of special rare characters (e.g., "^", "*", "@", ect.)

In block 1130, a hash signature of the N special tokens is calculated, resulting in one of the document signatures. The hash can be calculated in any number or ways. In one embodiment, the special tokens are concatenated prior to the hash calculation. In another embodiment, the special tokens are hashed individually and their hashes are then concatenated to form the signature. Any appropriate hash function may be used, and any combination of hashing techniques may be utilized.

In one embodiment, before the next M tokens are selected, P tokens on the list of tokens are skipped from the first token of the M tokens. For example, if P were zero, the next M tokens would be identical to the current M tokens, hence zero is not an allowed value for P. If P is less than M, then the next set of M tokens will overlap with the current set of M tokens. If P is equal to M, then the first token of the next M tokens will immediately follow the last token of the current M tokens. If P is greater than M, then there will be some tokens skipped between the next and the current M tokens.

In block 1040 a determination is made as to whether all signatures have been generated. In one embodiment, this can be done by observing that there are less than M tokens remaining on the list, hence, the next M tokens cannot be selected. If all signatures for the document have been generated, then the process terminates. However, if more signatures are to be generated for the document, then the next M tokens are selected by reverting to block 1110.

Figure 10:
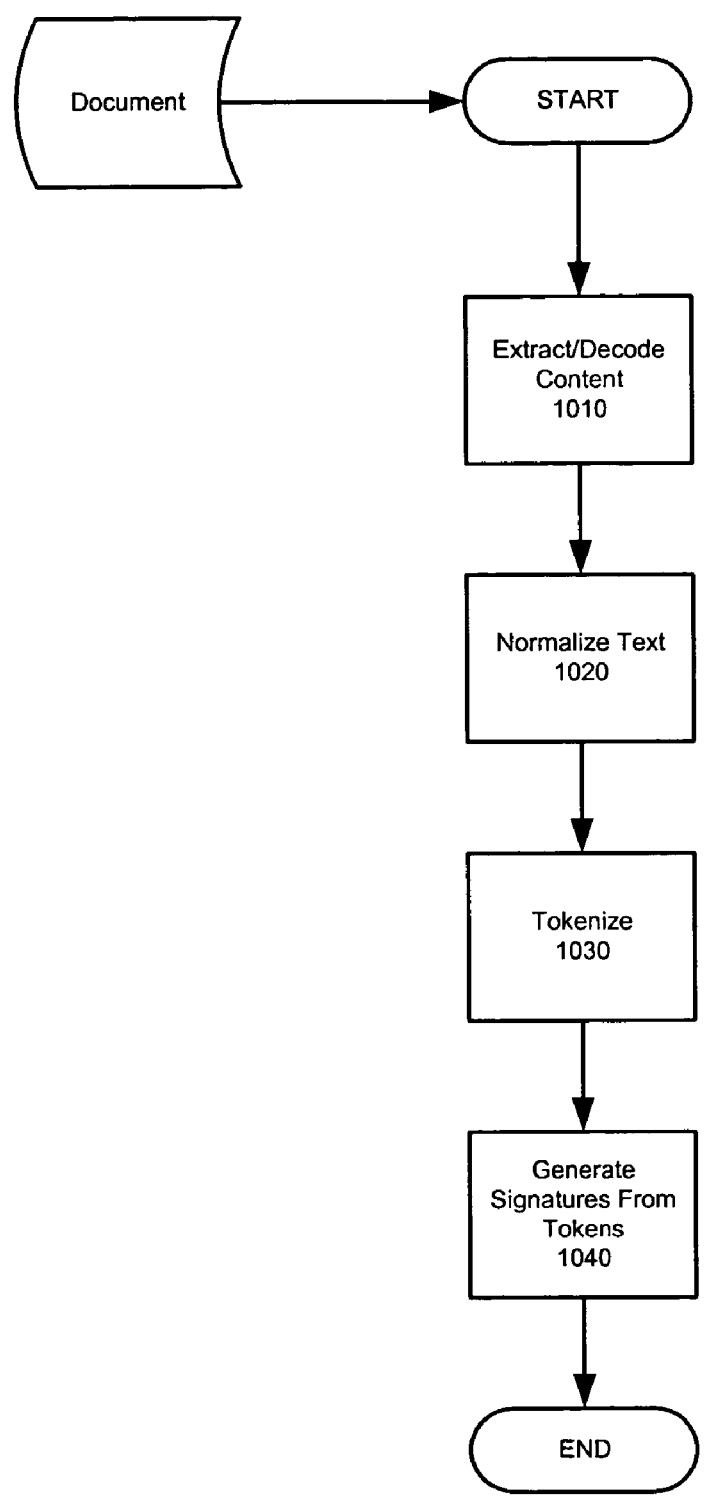
FIG. 10 is a flow diagram illustrating signature generation processing according to one embodiment of the present invention.

There are numerous other ways to perform each of the blocks of FIGS. 10 and 11. Some blocks can be skipped entirely in some embodiments. For example, block 1030 in FIG. 10 can be skipped and the signatures can be generated directly from the normalized text. Regarding FIG. 11, various values may be used for M, N, and P, each combination generating a different number of signatures. The specific configuration of M, N, and P will thus depend on the needs of the enterprise and the volume and content of captured and registered documents. In one embodiment, M may range between 8-20, N between 8-10, and P between 4-40.

Figure 12:
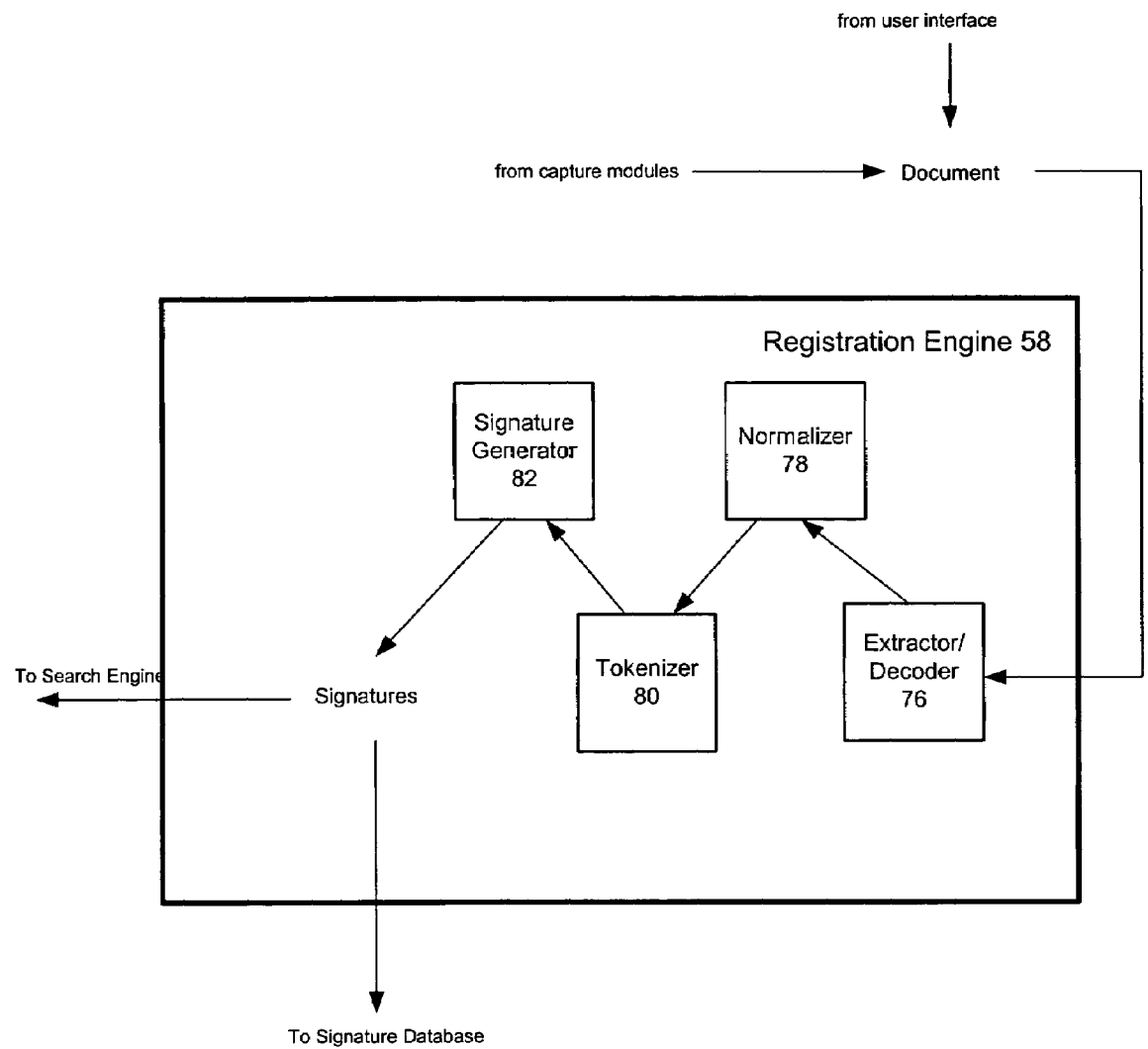
FIG. 12 is a block diagram illustrating a registration engine according to one embodiment of the present invention.

One embodiment of the registration engine 58 that generates signatures for documents is described with reference to FIG. 12. As described above, in one embodiment, the input of the registration engine 58 is a document, and the registration engine 58 generates signatures over the document. The document may be one being registered via the user interface, or one being captured by the capture modules, as described above.

In one embodiment, the registration engine includes an extractor/decoder 76 to perform the functionality described with reference to block 1010 of FIG. 10. In one embodiment, the registration engine also includes a normalizer 78 to perform the functionality described with reference to block 1020 of FIG. 10. In one embodiment, the registration engine also includes a tokenizer 80 to perform the functionality described with reference to block 1030 of FIG. 10. In one embodiment, the registration engine also includes a signature generator 82 to perform the functionality described with reference to block 1040 of FIG. 10. In one embodiment, the signature generator implements the process described with reference to FIG. 11.

The various processes for generating signatures over a document have been described in the context of a registration engine of a registration module of a content capture system. However, the embodiments described above may be used to generate signatures over a document that can be utilized in many other ways.

Thus, a capture system and a document/content registration system have been described. Furthermore, a process for generating signatures over a document that can be used for document registration has been described. In the forgoing description, various specific values were given names, such as "signature" and "item," and various specific modules, such as the "registration engine" and "signature database" have been described. However, these names are merely to describe and illustrate various aspects of the present invention, and in no way limit the scope of the present invention. Furthermore, various modules, such as the extractor/decoder 76 and the tokenizer 80 in FIG. 12, can be implemented as software or hardware modules, or without dividing their functionalities into modules at all. The present invention is not limited to any modular architecture either in software or in hardware, whether described above or not.

What is claimed is:

1. A method for generating a plurality of signatures over a document, the method comprising:
    extracting content from the document;
    normalizing the extracted content; generating the plurality of signatures using the normalized content; and tokenizing the normalized content prior to generating the plurality of signatures;
    wherein tokenizing the normalized content comprises creating an ordered list of tokens by converting each delimited item in the normalized content into a token;
    wherein generating the plurality of signatures comprises:
        i) selecting M consecutive tokens from the ordered list of tokens, M being a positive integer;
        ii) selecting N special tokens from the M consecutive tokens, N being a positive integer not greater than M;
        iii) generating a signature by calculating a hash over the N special tokens;
        iv) skipping ahead P tokens from the first of the M consecutive tokens, P being a positive integer; and
        v) repeating i), ii), iii), and iv) until the plurality of signatures have been generated.

2. The method of claim 1, wherein extracting the content from the document comprises identifying a content type of the document, and applying an appropriate text extractor/decoder to the document based on the content type.

3. The method of claim 1, wherein extracting the content from the document further comprises decoding the content contained in the document.

4. The method of claim 1, wherein normalizing the extracted content comprises eliminating irrelevant text from the extracted content.

5. The method of claim 1, wherein normalizing the extracted content comprises delimiting the extracted content into items by comparing strings of the extracted content to a plurality of normalization patterns.

6. The method of claim 1, wherein each token comprises a fixed-length hash of a delimited item.

7. The method of claim 1, wherein generating the plurality of signatures comprises selecting a plurality of tokens from the ordered list of tokens and calculating a plurality of hashes using the selected tokens.

8. The method of claim 1, wherein selecting N special tokens comprises selecting N special tokens based, at least in part, on token priority.

9. The method of claim 1, wherein token priority is based on a type of delimited item used to create the token.

10. The method of claim 1, wherein token priority is based on the frequency of each token.

11. The method of claim 1, further comprising comparing the plurality of signatures with signatures stored in a signature database, and observing registered content contained in the document based on the comparison.

12. An apparatus comprising:
    an extractor/decoder to extract content from a document;
    a normalizer to normalize the extracted content;
    a signature generator to generate a plurality of signatures using the normalized content; and
    a tokenizer configured to create an ordered list of tokens by converting each delimited item in the normalized content into a token;
    wherein the signature generator is configured to generate the plurality of signature by:
        i) selecting M consecutive tokens from the ordered list of tokens, M being a positive integer;
        ii) selecting N special tokens from the M consecutive tokens, N being a positive integer not greater than M;
        iii) generating a signature by calculating a hash over the N special tokens;
        iv) skipping ahead P tokens from the first of the M consecutive tokens, P being a positive integer; and
        v) repeating i), ii), iii), and iv) until the plurality of signatures have been generated.

13. The apparatus of claim 12, further comprising a content classifier to determine a type of content contained in the document, wherein the extractor/decoder used to extract the content from the document is selected from a plurality of extractor/decoders based on the type of content.

14. The apparatus of claim 12, wherein the normalizer eliminates irrelevant text from the extracted content.

15. The apparatus of claim 12, wherein each token comprises a fixed-length hash of a delimited item.

16. The apparatus of claim 12, wherein the signature generator selects a plurality of tokens from the ordered list of tokens, and calculates a plurality of hashes using the selected tokens.

17. The apparatus of claim 12, wherein the signature generator selects the N special tokens based, at least in part, on token priority.

18. The apparatus of claim 12, wherein token priority is based on a type of delimited item used to create the token.

19. The apparatus of claim 12, wherein token priority is based on the frequency of each token.

20. The apparatus of claim 12, further comprising search engine to compare the plurality of signatures with signatures stored in a signature database, and a notification module to alert a user that registered content is contained in the document based on the comparison.

21. A tangible computer readable medium having stored thereon data representing instructions that, when executed by a processor, cause the processor to perform operations comprising:
    extracting content from the document;
    normalizing the extracted content; and
    generating a plurality of signatures using the normalized content;
    wherein the instructions further cause the processor to tokenize the normalized content prior to generating the plurality of signatures;
    wherein tokenizing the normalized content comprises creating an ordered list of tokens by converting each delimited item in the normalized content into a token; and
    wherein generating the plurality of signatures comprises:
        i) selecting M consecutive tokens from the ordered list of tokens, M being a positive integer;
        ii) selecting N special tokens from the M consecutive tokens, N being a positive integer not greater than M;
        iii) generating a signature by calculating a hash over the N special tokens;

iv) skipping ahead P tokens from the first of the M consecutive tokens, P being a positive integer; and v) repeating i), ii), iii), and iv) until the plurality of signatures have been generated.

22. The tangible computer readable medium of claim 21, wherein extracting the content from the document comprises identifying a content type of the document, and applying an appropriate text extractor/decoder to the document based on the content type.

23. The tangible computer readable medium of 21, wherein extracting the content from the document further comprises decoding the content contained in the document.

24. The tangible computer readable medium of 21, wherein normalizing the extracted content comprises eliminating irrelevant text from the extracted content.

25. The tangible computer readable medium of claim 21, wherein each token comprises a fixed-length hash of a delimited item.

26. The tangible computer readable medium of claim 21, wherein generating the plurality of signatures comprises selecting a plurality of tokens from the ordered list of tokens and calculating a plurality of hashes using the selected tokens.

27. The tangible computer readable medium of 21, wherein the instructions further cause the processor to compare the plurality of signatures with signatures stored in a signature database, and to observe registered content contained in the document based on the comparison.

* * * * *